(12) United States Patent
Sakai et al.

(10) Patent No.: US 9,878,381 B2
(45) Date of Patent: Jan. 30, 2018

(54) HORIZONTAL BAND SAW MACHINE

(71) Applicants: AMADA HOLDINGS CO., LTD., Kanagawa (JP); AMADA MACHINE TOOLS CO., LTD., Kanagawa (JP)

(72) Inventors: Norihisa Sakai, Kanagawa (JP); Akio Seto, Kanagawa (JP)

(73) Assignees: AMADA HOLDINGS CO., LTD., Kanagawa (JP); AMADA MACHINE TOOLS CO., LTD., Kanagawa (JP)

( * ) Notice: Subject to any disclaimer, the term of this patent is extended or adjusted under 35 U.S.C. 154(b) by 64 days.

(21) Appl. No.: 14/904,815

(22) PCT Filed: Jul. 2, 2014

(86) PCT No.: PCT/JP2014/067625
§ 371 (c)(1),
(2) Date: Jan. 13, 2016

(87) PCT Pub. No.: WO2015/019755
PCT Pub. Date: Feb. 12, 2015

(65) Prior Publication Data
US 2016/0158857 A1    Jun. 9, 2016

(30) Foreign Application Priority Data

Aug. 9, 2013   (JP) ................. 2013-165753

(51) Int. Cl.
*B23D 55/08*    (2006.01)
*B23D 55/04*    (2006.01)
*B23D 53/04*    (2006.01)

(52) U.S. Cl.
CPC .......... *B23D 55/086* (2013.01); *B23D 53/04* (2013.01); *B23D 55/04* (2013.01); *B23D 55/082* (2013.01)

(58) Field of Classification Search
CPC .... B23D 55/082; B23D 55/086; B23D 55/08; B27B 13/10; Y10T 83/148; Y10T 83/152; Y10T 83/606
(Continued)

(56) References Cited

U.S. PATENT DOCUMENTS 2,914,100 A * 11/1959 Lindholm ............ B23D 55/084
                                                            83/74
3,570,346 A *  3/1971 Koinzan ................ B23D 53/04
                                                            83/389
(Continued)

FOREIGN PATENT DOCUMENTS

EP       1234629       8/2002
JP       60-52218      3/1985
(Continued)

OTHER PUBLICATIONS

International Search Report issued in PCT/JP2014/067625, dated Jul. 29, 2014.
(Continued)

*Primary Examiner* — Andrea Wellington
*Assistant Examiner* — John E Grosselin, III
(74) *Attorney, Agent, or Firm* — Greenblum & Bernstein, P.L.C.

(57) ABSTRACT

A horizontal band saw machine includes a pair of jaws, a pair of saw blade wheels, a band saw blade looped over the saw blade wheels, a pair of saw blade guides, a contact guide attached to the other of the pair of jaws, a coupling bracket connected to the other of the pair of saw blade guides to locate a distal end thereof below the other of the pair of saw blade wheels, and a follower member provided at the distal end of the coupling bracket. The contact guide and the coupling bracket are configured to move one of the pair of saw blade guides until the follower member contacts with (Continued)

the contact guide when the band saw blade is fed circularly in a state where the band saw blade is clamped by the one of the pair of saw blade guides.

5 Claims, 6 Drawing Sheets

(58) Field of Classification Search
USPC .......................................................... 83/820
See application file for complete search history.

(56) References Cited

U.S. PATENT DOCUMENTS

| | | | | |
|---|---|---|---|---|
| 3,789,717 | A * | 2/1974 | Stolzer | B23D 55/04 83/454 |
| 3,830,131 | A * | 8/1974 | Wells | B23D 55/082 83/546 |
| 3,875,839 | A * | 4/1975 | Aizawa | B23D 55/088 83/360 |
| 4,335,638 | A * | 6/1982 | Schocher | B23D 55/04 83/454 |
| 4,454,795 | A * | 6/1984 | Ellis | B23D 55/082 83/796 |
| 4,620,465 | A * | 11/1986 | Taguchi | B23D 55/06 83/311 |
| 4,674,374 | A * | 6/1987 | Sadahiro | B23D 55/043 83/360 |
| 4,766,790 | A * | 8/1988 | Harris | B23D 53/08 83/56 |
| 4,901,612 | A * | 2/1990 | Harris | B23D 53/08 83/56 |
| 5,787,774 | A * | 8/1998 | Richards | B23D 53/04 83/13 |
| 6,202,528 | B1 * | 3/2001 | Morgan | B23D 55/082 83/820 |
| 2002/0073818 | A1 * | 6/2002 | Stolzer | B23D 55/043 83/206 |
| 2003/0024371 | A1 * | 2/2003 | Gibson | B23D 53/001 83/795 |
| 2005/0109184 | A1 * | 5/2005 | Belfiglio | B23D 55/082 83/820 |
| 2014/0352513 | A1 * | 12/2014 | Chiao | B25B 1/2489 83/453 |
| 2014/0352515 | A1 * | 12/2014 | Chiao | B23D 59/04 83/788 |
| 2015/0020660 | A1 * | 1/2015 | Jeng | B23D 59/001 83/74 |

FOREIGN PATENT DOCUMENTS

| | | |
|---|---|---|
| JP | 8-224622 | 9/1996 |
| JP | 10-43939 | 2/1998 |
| JP | 2006-255839 | 9/2006 |
| JP | 2009-297813 | 12/2009 |
| JP | 2011-79109 | 4/2011 |
| TW | M262291 | 4/2005 |
| TW | M362753 | 8/2009 |

OTHER PUBLICATIONS

Office Action issued in Taiwan Counterpart Patent Appl. No. 103124521, dated Apr. 1, 2016 , along with an English translation thereof.

* cited by examiner

FIG. 6
(a) - Prior Art -
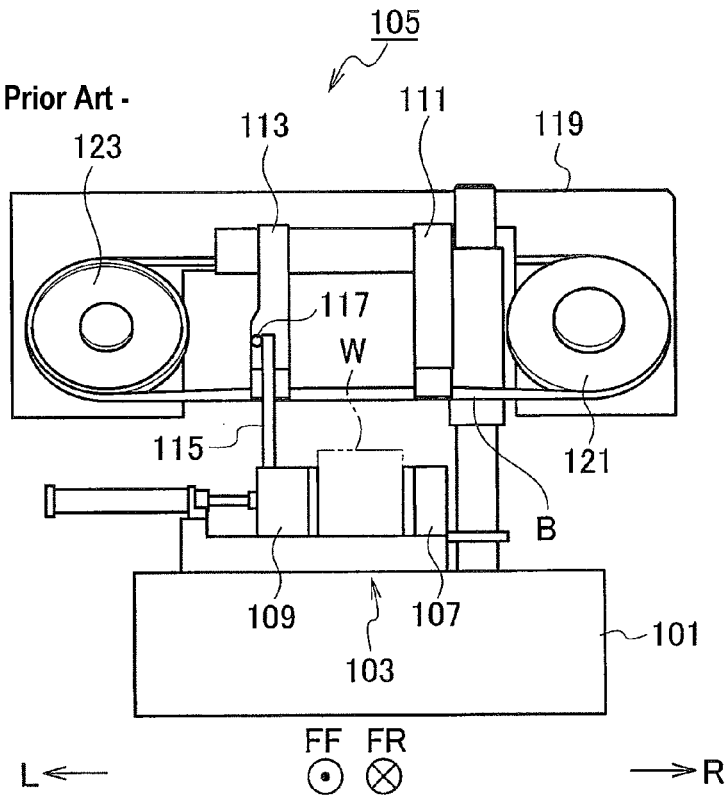
(b) - Prior Art -
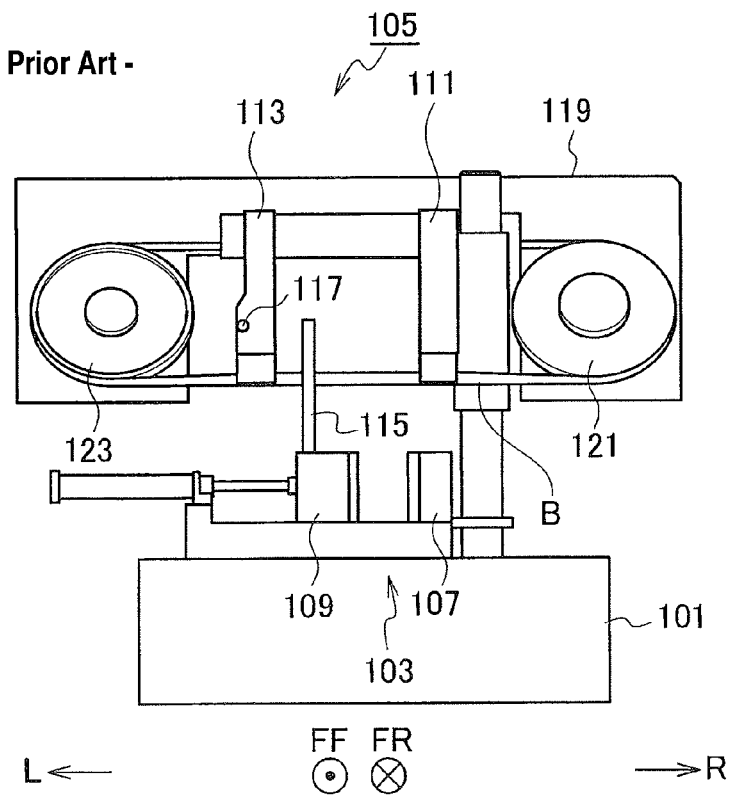

HORIZONTAL BAND SAW MACHINE

TECHNICAL FIELD

The present invention relates to a horizontal band saw machine for cutting a workpiece stopped still on its feed direction while feeding its endless band saw blade circularly.

BACKGROUND ART

Widely prevalent is a horizontal band saw machine that is provided with a (so-called "divided-vise type") vise mechanism for clamping a workpiece at both upstream and downstream sides of its cutting position. In addition, a divided-vise type vise mechanism includes two sets of vises. Each of the two sets has a pair of jaws that face to each other along a width direction of a workpiece perpendicular to its feed direction. One of the two sets of vises is located on the downstream side of the cutting position along the feed direction, and another thereof is located on the upstream side of the cutting position along the feed direction. In addition, one of the jaws is located on one side along the width direction, and another thereof is movable in the width direction on another side hereof (see Patent Documents 1 and 2 listed below).

In the horizontal band saw machine provided with the divided-vise type vise mechanism, used is a configuration for automatically adjusting a distance of the pair of saw blade guides according to a width of a workpiece. The pair of saw blade guides is suspended between a pair of saw blade wheels on a cutting head (saw blade housing). One of the saw blade guides is located on the one side along the width direction, and another of the saw blade guides is movable in the width direction on the other side thereof.

As the configuration for automatically adjusting the distance of the pair of saw blade guides, a contact guide extended vertically is provided on the other jaw of the upstream-set vise. In addition, a follower member that contacts with the contact guide is provided on a back surface of the other of saw blade guides. When a band saw blade is circularly fed in a state where the band saw blade is clamped by a saw blade insert of the other of saw blade guides, the other of saw blade guides slides toward the one side in the width direction until the follower member contacts with the contact guide.

Therefore, when the band saw blade is circularly fed by rotating the pair of saw blade wheels after clamping the workpiece by the two sets of vises, the other of blade guides can be moved to a position associated with the other-side jaw. Namely, the distance between the pair of saw blade guides can be automatically adjusted according to the width of the workpiece.

PRIOR ART DOCUMENT

Patent Document

Patent Document 1: Japanese Patent Application Publication No. 2011-79109
Patent Document 2: Japanese Patent Application Publication No. 2009-297813

SUMMARY OF INVENTION

As shown in FIG. 6(a), also widely prevalent is a horizontal band saw machine 105 in which a vise mechanism 103 is provided on a downstream side of a cutting position, along a feed direction of the workpiece W, on a base 101 in order to reduce residual materials. In addition, the vise mechanism 103 on the downstream side has a pair of jaws 107 and 109 that face to each other along a width direction, similarly to a divided-vise type vise mechanism. In a case of applying a configuration for automatically adjusting a distance between a pair of saw blade guides 111 and 113 according to a width of a workpiece W to this horizontal band saw machine 105, a contact guide 115 and a follower member 117 are located between a pair of saw blade wheels 121 and 123 provided on a cutting head 119. Therefore, when replacing a band saw blade B from the downstream side, it is required to form a gap for passing the band saw blade B therethrough between the contact guide 115 and the follower member 117 by moving the other-side jaw 109 toward one side (rightward in FIG. 6(b)) as shown in FIG. 6(b) or by moving the other-side saw blade guide 113 toward another side (leftward in FIG. 6(b)). As the result, a replacing operation of the band saw blade B becomes complicated. Especially in a case where the workpiece W exists between the pair of jaws 107 and 109, it is required to remove the workpiece W from a position between the pair of jaws 107 and 109 before moving the other-side jaw 109 toward the one side in the width direction, and thereby a replacing operation of the hand saw blade B becomes complicated further.

Therefore, an object of the present invention is to provide a horizontal band saw machine that is provided with a vise mechanism on a downstream side of a cutting position, and can adjust a distance of a pair of saw blade guides automatically according to a width of a workpiece and improve operating efficiency for replacing a band saw blade.

A first aspect of the present invention provides a horizontal band saw machine that cuts a workpiece stopped on a feed direction while feeding an endless band saw blade circularly, the machine comprising: a base; a vise mechanism that is provided on a downstream side of a cutting position on the base, and includes a pair of jaws that faces to each other along a width direction perpendicular to the feed direction to clamp the workpiece, one of the pair of jaws being provided on one side with respect to the cutting position along the width direction, and another thereof being provided movably on another side along the width direction; a cutting head that is provided on the base vertically-movably, and extends in the width direction; a pair of saw blade wheels that are provided rotatably on the cutting head, and distanced from each other along the width direction; the band saw blade that is looped over the pair of saw blade wheels; a saw blade guide mechanism having a pair of saw blade guides that are suspended from the cutting head between the pair of saw blade wheels, saw blade guide inserts being provided at respective lower ends of the pair of saw blade guides, one of the pair of saw blade guides being provided on the one side, another thereof being provided on the other side movably in the width direction, and the band saw blade being twisted between the pair of saw blade guides to orient saw teeth thereof downward; a contact guide that is attached to the other of the pair of jaws, and extends vertically; a coupling bracket of which base end is connected to the other of the pair of saw blade guides, and that is extended in the width direction to locate a distal end thereof below the other of the pair of saw blade wheels; and a follower member that is provided at the distal end of the coupling bracket, and slidably contacts with the contact guide, wherein the contact guide and the coupling bracket are configured to move the other of the pair of saw blade guides toward the one side in the width direction until the follower member contacts with the contact guide by feeding the band saw blade circularly in a state where the band saw blade is clamped by the saw blade insert of the other of the pair of saw blade guides.

Note that the "cutting position" is a position on the feed direction where cutting is done. In addition, the term "provided" includes a case of being provided indirectly with another member interposed therebetween. Further, the term "suspended" includes a case of being suspended indirectly with another member interposed therebetween.

Here, since the contact guide is integrally provided on the other side of the other jaw, so that the contact guide is never located in an area between the pair of saw blade wheels, when seen from a downstream side of the cutting position along the feed direction, during or after a cutting operation. In addition. the distal end of the coupling bracket is located below the other saw blade wheel and the follower member is provided on the distal end, so that the follower member is never located in the area between the pair of saw blade wheels, when seen from the downstream side of the cutting position along the feed direction, during or after a cutting operation. Namely, the contact guide and the follower member are never located in the area causing interruption of replacement of the band saw blade.

According to the first aspect, a distance between the pair of saw blade guides can be adjusted automatically according to a width of the workpiece by circularly-feeding of the saw blade. In addition, the contact guide and the follower member are never located at a position causing interruption of a replacing operation of the band saw blade, so that operating efficiency for the replacement can be improved.

A second aspect of the present invention provides a horizontal band saw machine that cuts a workpiece stopped on a feed direction while feeding an endless band saw blade circularly, the machine comprising: a base; a vise mechanism that is provided on a downstream side of a cutting position on the base, and includes a pair of jaws that faces to each other along a width direction perpendicular to the feed direction to clamp the workpiece, one of the pair of jaws being provided on one side with respect to the cutting position along the width direction, and another thereof being provided movably on another side along the width direction; a cutting head that is provided on the base vertically-movably, and extends in the width direction; a pair of saw blade wheels that are provided rotatably on the cutting head, and distanced from each other along the width direction; the band saw blade that is looped over the pair of saw blade wheels; a saw blade guide mechanism having a pair of saw blade guides that are suspended from the cutting head between the pair of saw blade wheels, saw blade guide inserts being provided at respective lower ends of the pair of saw blade guides, one of the pair of saw blade guides being provided on the one side, another thereof being provided on the other side movably in the width direction, and the band saw blade being twisted between the pair of saw blade guides to orient saw teeth thereof downward; a contact guide that is attached to the other of the pair of jaws, and extends vertically, a guide groove extending vertically being formed thereon; a coupling bracket of which base end is connected to the other of the pair of saw blade guides, and that is extended in the width direction to locate a distal end thereof below the other of the pair of saw blade wheels; and a follower member that is provided at the distal end of the coupling bracket, and slidably contacts with the contact guide within the guide groove, wherein the contact guide and the coupling bracket are configured to move the other of the pair of saw blade guides in the width direction while following to the other of the pair of jaws when the other of the pair of jaws is moved in the width direction.

According to the second aspect, the follower member is always held in the guide groove of the contact guide, so that a distance between the pair of saw blade guides can be adjusted automatically according to a width of the workpiece by moving the pair of jaws for clamping the workpiece. In addition, the contact guide and the follower member are never located at a position causing interruption of a replacing operation of the band saw blade, so that operating efficiency for the replacement can be improved.

BRIEF DESCRIPTION OF DRAWINGS

FIGS. 6(a) and 6(b) are front views of a prior-art horizontal band saw machine.

DESCRIPTION OF EMBODIMENTS

Figure 1:
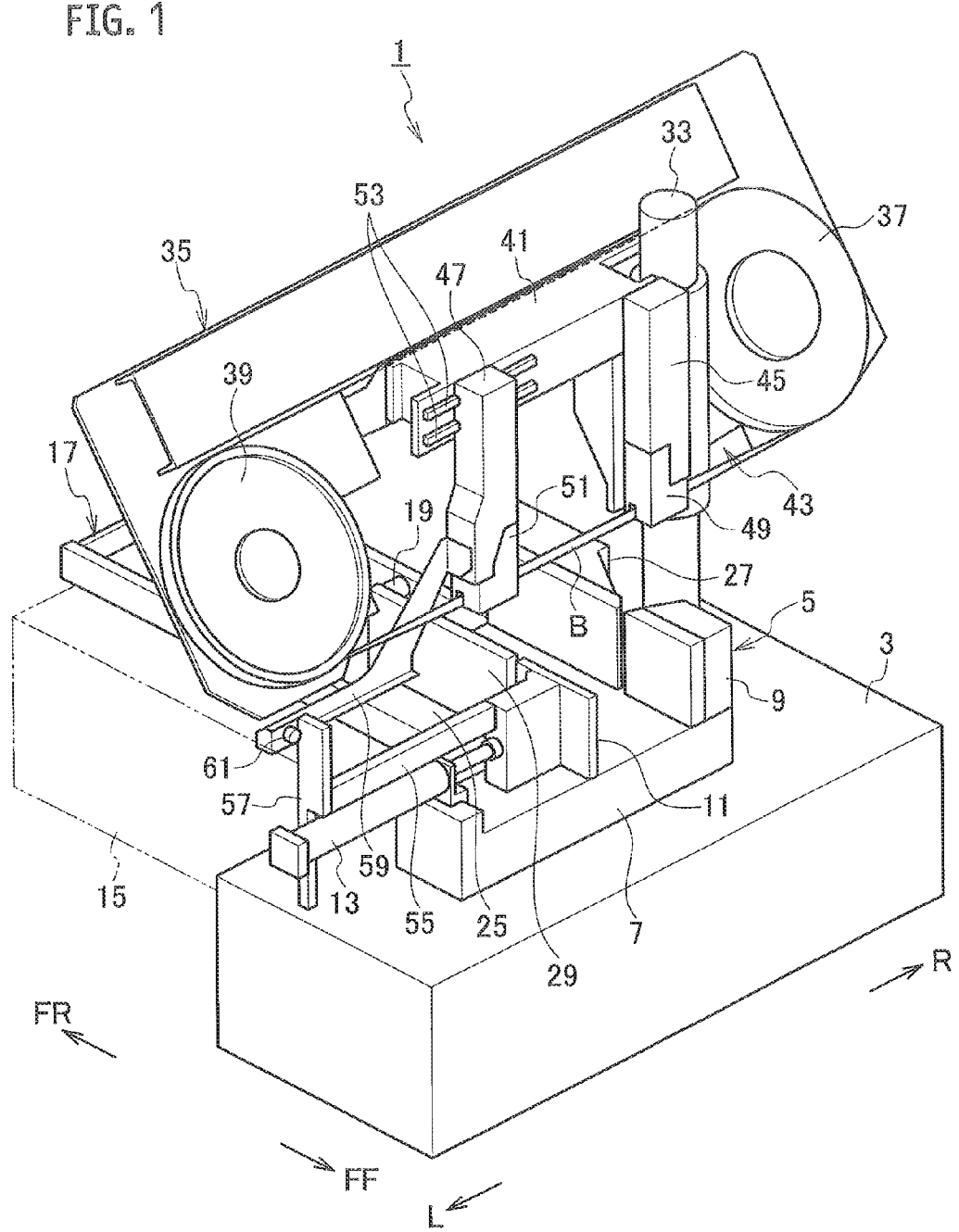
FIG. 1 It is a perspective view of a horizontal band saw machine according to an embodiment.

A horizontal band saw machine according to an embodiment will be explained with reference to FIG. 1 to FIG. 4. In the drawings, "FF" indicates a forward direction, "FR" indicates a rearward direction, "L" indicates a leftward direction, and "R" indicates a rightward direction (they are similar in FIGS. 6(a) and (b)).

Figure 2:
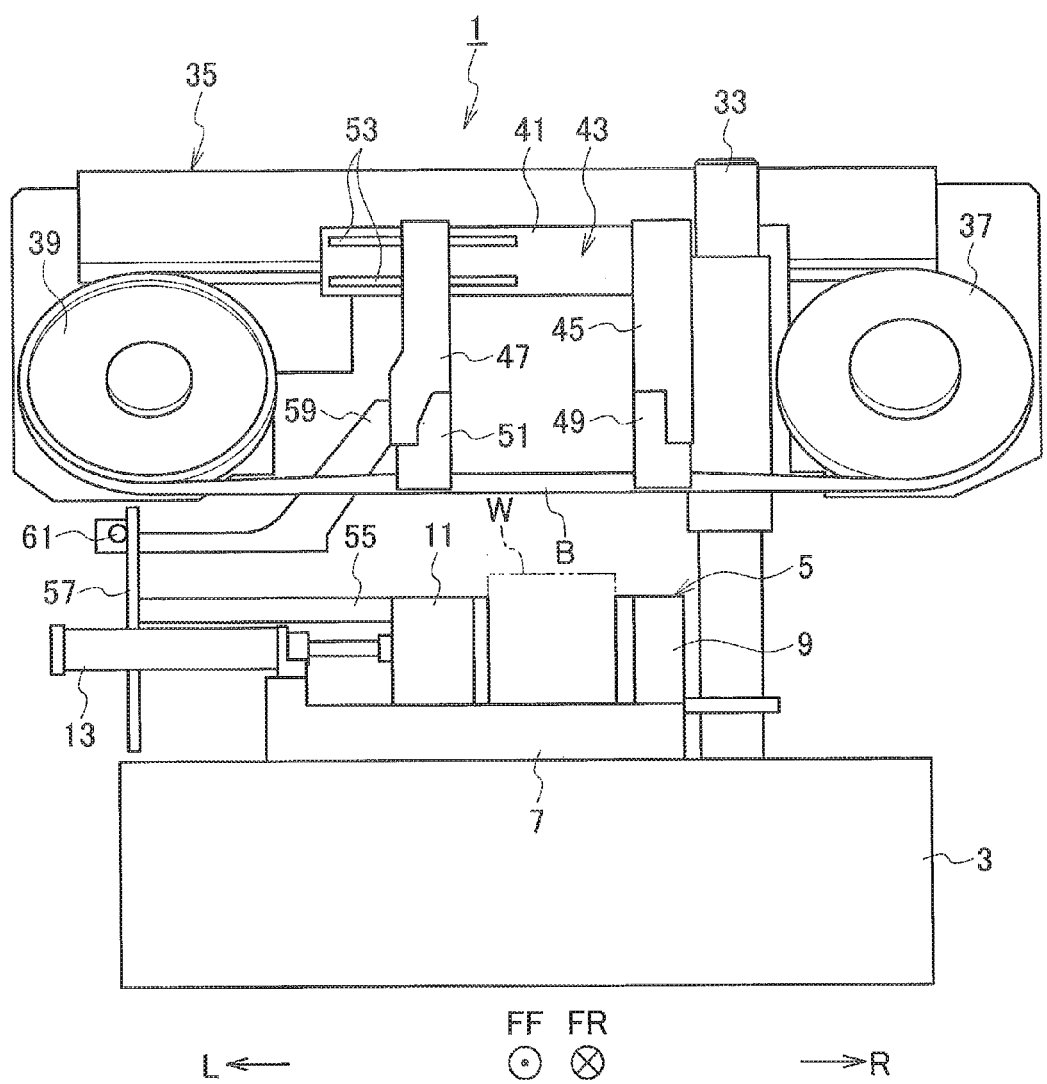
FIG. 2 It is a front view of the horizontal band saw machine.

The horizontal band saw machine 1 according to an embodiment cuts a workpiece W stopped still on its feed direction (FR to FF) while feeding an endless band saw blade B circularly. As shown in FIG. 1 and FIG. 2, the horizontal band saw machine 1 includes a base 3 extending in a width direction (left-to-right direction) perpendicular to the feed direction, and a vise mechanism 5 for clamping the workpiece W is provided on a downstream side of a cutting position CP located on the base 3. The vise mechanism 5 includes a vise bed (working table) 7 that supports the workpiece W and is fixed on the base 3. A fixed jaw (first jaw) 9 is provided at a right-side portion of the vise bed 7 (on one side along the width direction). A movable jaw (second jaw) 11 is provided at a left-side portion from the center of the vise bed 7 (on another side along the width direction) so as to face to the fixed jaw 9 along the width direction. The movable jaw 11 can be moved in the width direction by a cylinder 13 provided on the vise bed 7. Note that the fixed jaw 9 can be slightly moved in the width direction by a mini-cylinder (not shown in the drawings).

Figure 3:
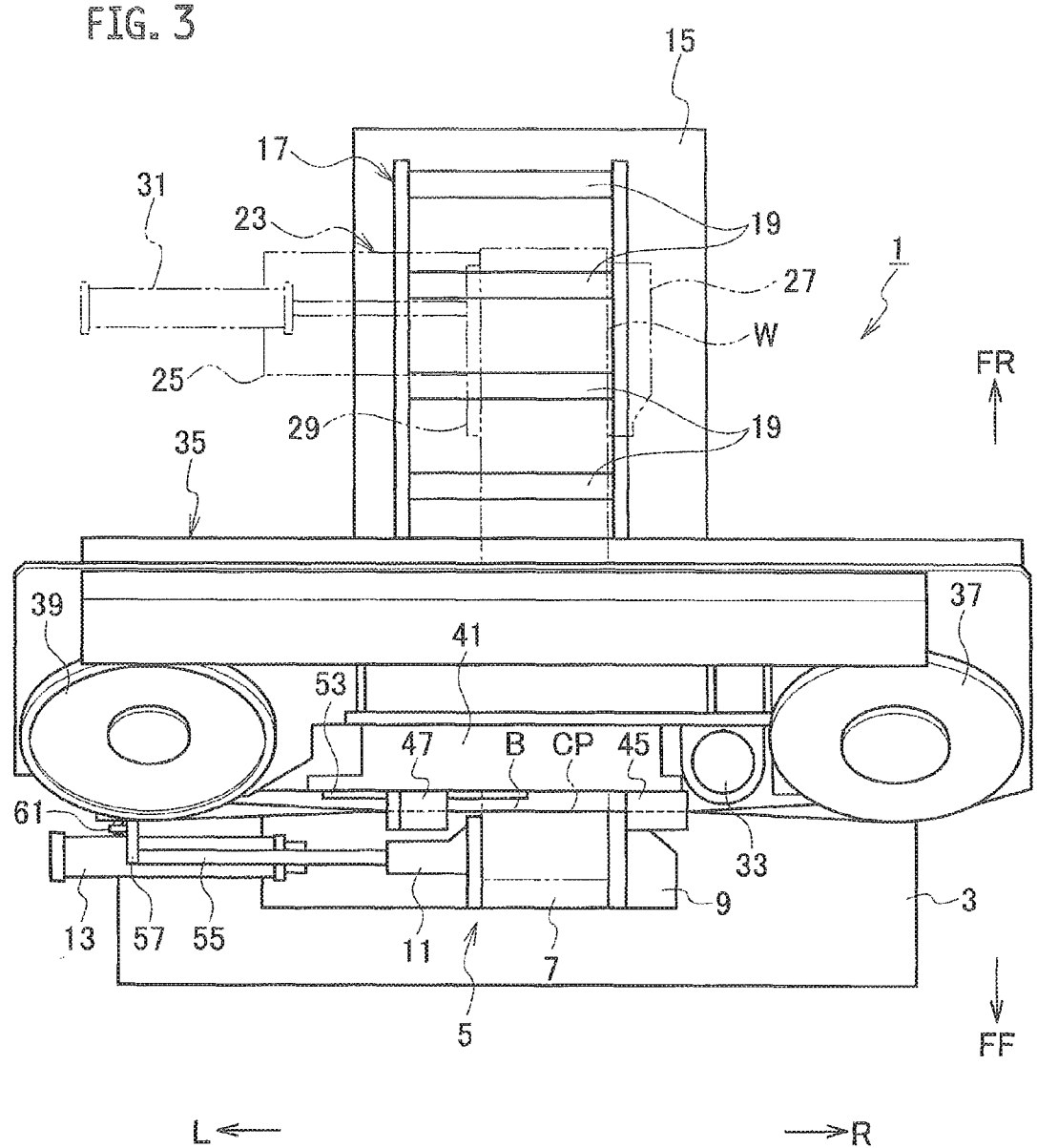
FIG. 3 It is a plan view of the horizontal band saw machine.

As shown in FIG. 1 and FIG. 3, a rear frame 15 is provided on a rear side of the base 3. A rear table (feed table) 17 for supporting the workpiece W movably along the feed direction is provided on the rear frame 15. The rear table 17 includes plural feed rollers 19 that are aligned along the feed direction at intervals. Each of the feed rollers 19 is rotatable about its axial center extending in the width direction.

Figure 4:
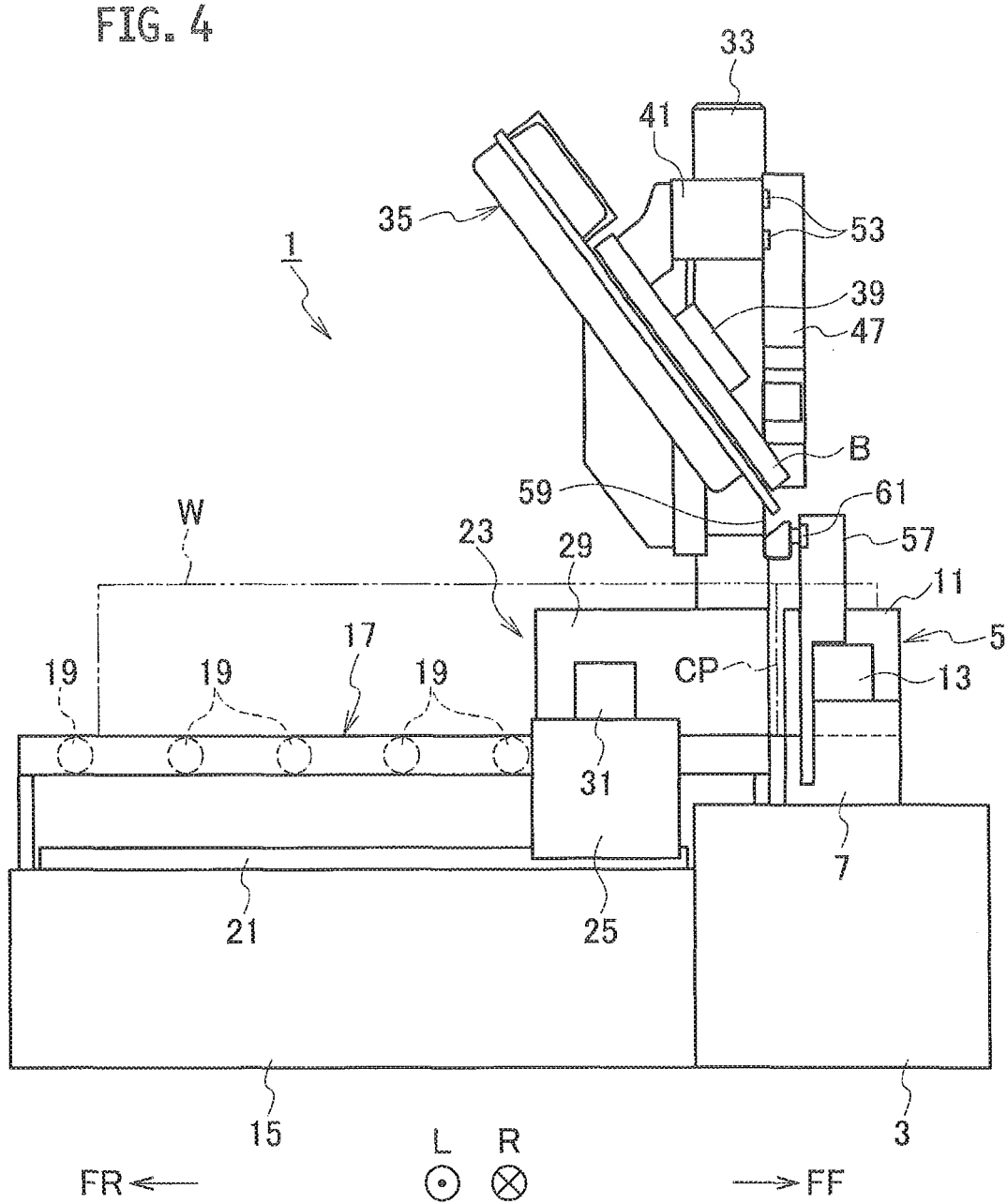
FIG. 4 It is a side view of the horizontal band saw machine.

As shown in FIG. 4, plural guide rails 21 each of which extends in the feed direction are provided below the rear table 17 (only one of them is shown). A feed vise mechanism 23 for clamping the workpiece W is provided slidably along the feed direction on the guide rails 21. The feed vise mechanism 23 can be moved in the feed direction by an electric motor (not shown in the drawings) or an oil hydraulic cylinder (not shown in the drawings) that is provided on the base 3. In addition, the feed vise mechanism 23 includes a feed bed (slider) 25 that is movable in the feed direction along the guide rails 21. A fixed feed jaw (first feed jaw) 27 is provided on a right side of the feed bed 25. A movable feed jaw (second feed jaw) 29 is provided so as to face to the fixed feed jaw 27 along the width direction. The movable feed jaw 29 can be moved in the width direction by a movable cylinder 31 provided on the feed bed 25. Note that the fixed feed jaw 27 can be slightly moved in the width direction by a mini-cylinder (not shown in the drawings).

A guide post 33 extended vertically is provided near the cutting position CP on the base 3. A cutting head (saw blade housing) 35 extending in the width direction is provided on the guide post 33 vertically-movably. Namely, the cutting head 35 is provided on the base 3 vertically-movably with the guide post 33 interposed therebetween. In addition, the cutting head 35 can be moved vertically by an electric motor (not shown in the drawings) or an oil hydraulic cylinder (not shown in the drawings) that is provided on the base 3.

A pair of saw blade wheels 37 and 39 over which the band saw blade B is looped is provided rotatably on the cutting head 35. The pair of saw blade wheels 37 and 39 is distanced from each other along the width direction, and supports the looped band saw blade B. The one saw blade wheel (saw blade drive wheel) 37 is rotated by an electric motor (not shown in the drawings) provided on the cutting head 35. The other saw blade wheel (saw blade driven wheel) 39 can be moved in the width direction by a cylinder (not shown in the drawings) provided on the cutting head 35. When the band saw blade B is fed circularly by the pair of saw blade wheels 37 and 39, the band saw blade B is fed from left to right at the cutting position CP in FIG. 3. Namely, the band saw blade B is fed circularly in a counter-clockwise in FIG. 3.

A beam member 41 extending in the width direction is disposed between the pair of saw blade wheels 37 and 39 on the cutting head 35. A saw blade guide mechanism 43 that supports the band saw blade B in a twisted state so as to orient its saw teeth vertically downward is provided on the beam member 41. Namely, the saw blade guide mechanism 43 is provided between the pair of saw blade wheels 37 and 39 on the cutting head 35 with the beam member 41 interposed therebetween. The saw blade guide mechanism 43 has a configuration similar to that of a saw blade guide mechanism disclosed in a JP Patent Application Publication No. 2006-255839. Specifically, the saw blade guide mechanism 43 includes a pair of saw blade guides 45 and 47 that are suspended from the beam member 41, and saw blade guide inserts 49 and 51 for clamping the band saw blade B being fed are provided at respective lower ends of the saw blade guides 45 and 47. The one saw blade guide (fixed saw blade guide) 45 is located on the one side along the width direction, and the other saw blade guide (movable saw blade guide) 47 is movable in the width direction on the other side. The other saw blade guide 47 slides along guide rails 53 provided on a side face of the beam member 41.

A featured portion of the horizontal band saw machine 1 will be described.

A base end of a coupling bar 55 is connected to an outer side (left end) of the movable jaw 11 along the width direction. The coupling bar 55 is extended outward in the width direction to locate a distal end of the coupling bar 55 below the saw blade driven wheel 39. In addition, a contact guide 57 extended vertically is attached to the distal end of the coupling bar 55. Namely, the contact guide 57 is attached to the outer side of the movable jaw 11 along the width direction with the coupling bar 55 interposed therebetween.

A base end of a coupling bracket 59 is connected to the movable saw blade guide 47. The coupling bracket 59 is extended outward in the width direction so that a distal end of the coupling bracket 59 is located below the saw blade driven wheel 39. In addition, a portion of the distal end of the coupling bracket 59 is located on the downstream side of the cutting position CP along the feed direction. Further, a follower roller (follower member) 61 slidably contacting an outer side of the contact guide 57 is provided at the distal end of the coupling bracket 59. The follower roller 61 is rotatable about its axial center parallel to the feed direction, and slidably contacts with the contact guide 57 while rotating along with a vertical movement of the cutting head 35.

When the band saw blade B is fed circularly by rotations of the pair of saw blade wheels 37 and 39 in a state where the band saw blade B is clamped by the saw blade insert 49 of the movable saw blade guide 47, the movable saw blade guide 47 is moved toward the one side (rightward) in the width direction until the follower roller 61 contacts with the contact guide 57. In addition, when the movable jaw 11 is moved toward the other side (leftward) in a state where the follower roller 61 contacts with the contact guide 57, the movable saw blade guide 47 is also moved toward the other side together with the movable jaw 11, because the coupling bar 55 and the coupling bracket 59 are coupled with each other via the follower roller 61 and the contact guide 57.

A cutting operation of a workpiece W by the horizontal band saw machine 1 will be described.

After laying a workpiece W on the rear table 17, the workpiece W is clamped by the fixed feed jaw 27 and the movable feed jaw 29 by moving the movable feed jaw 29 toward the one side in the width direction by the movable cylinder 31. Next, the feed vise mechanism 23 is moved in the feed direction by the electric motor or the oil hydraulic cylinder, and then stopped after feeding the workpiece W to a predetermined position in the feed direction. Subsequently, the movable jaw 11 is moved toward the one side in the width direction by the cylinder 13 to clamp the workpiece W near the cutting position CP. As the result, the workpiece W is fixed on the base 3.

After fixing the workpiece W on the base 3, the band saw blade B is fed circularly by rotating the pair of saw blade wheels 37 and 39 in a state where the band saw blade B is clamped by the saw blade insert 51 of the movable saw blade guide 47. According to this, the movable saw blade guide 47 is moved toward the one side in the width direction until the follower roller 61 contacts with the contact guide 57, and thereby the movable saw blade guide 47 is moved to a position associated with the movable jaw 11. Namely, a distance between the fixed saw blade guide 45 and the movable saw blade guide 47 is automatically adjusted according to a width of the workpiece W.

The workpiece W is cut by moving the cutting head 35 downward by the electric motor or the oil hydraulic cylinder in a state where the band saw blade B is being fed circularly. As the result, a product (not shown in the drawings) is cut away from the workpiece W.

Since the contact guide 57 is provided at the distal end of the coupling bar 55 located below the saw blade driven wheel 39, the contact guide 57 is never located between the pair of saw blade wheels 37 and 39 during and after the cutting operation. In addition, since the follower roller 61 is provided at the distal end of the coupling bracket 59 located below the saw blade driven wheel 39, the follower roller 61 is never located between the pair of saw blade wheels 37 and 39 during and after the cutting operation. Therefore, the contact guide 57 and the follower roller 61 never interrupt a replacing operation of the band saw blade B during and after the cutting operation.

According to the present embodiment, when replacing the band saw blade B from the downstream side of the cutting position CP under a condition where the distance between the fixed saw blade guide 45 and the movable saw blade guide 47 is made automatically adjustable according to the width of the workpiece W, a process such as moving the movable jaw 11 toward the one side in the width direction can be abbreviated. Therefore, according to the present embodiment, in a case where the vise mechanism 5 is disposed on the downstream side of the cutting position CP, operating efficiency for replacing the band saw blade B can be improved under the condition where the distance between the fixed saw blade guide 45 and the movable saw blade guide 47 is made automatically adjustable according to the width of the workpiece W.

Figure 5:
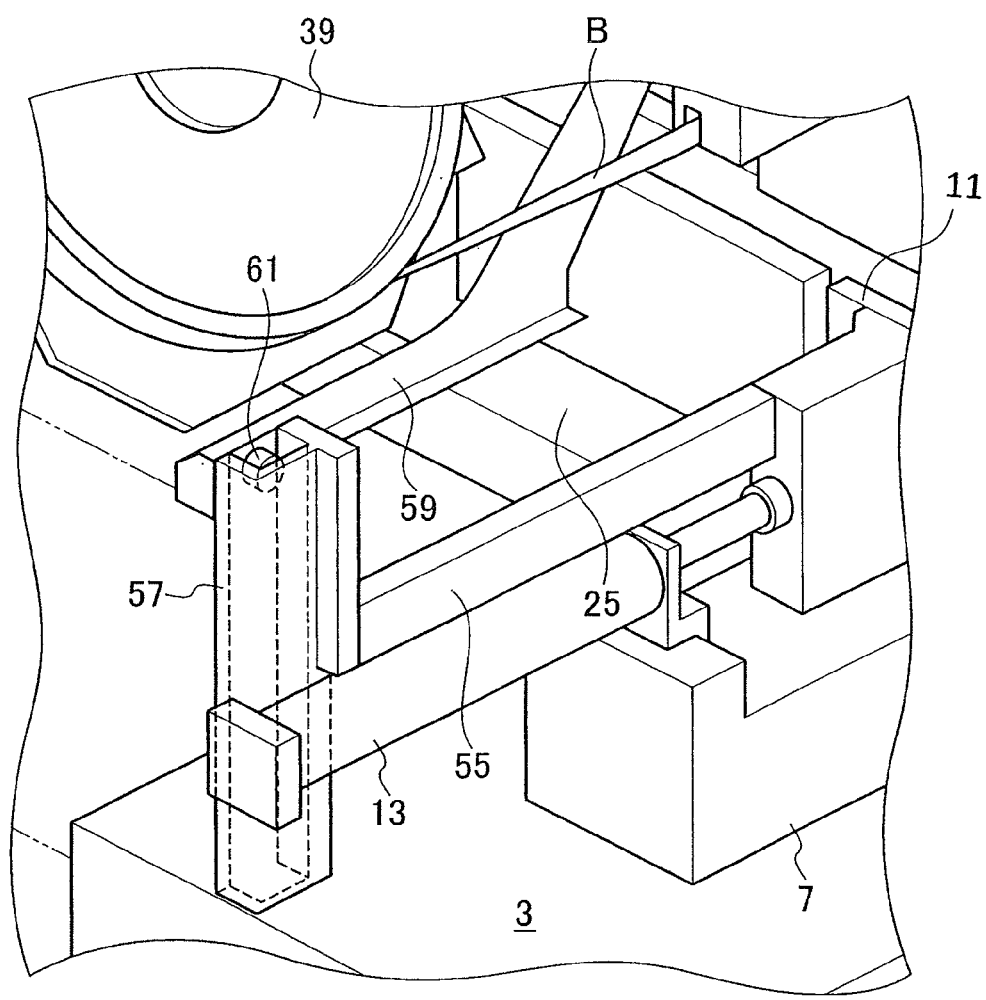
FIG. 5 It is a perspective view showing a featured portion in a modified example of the embodiment.

A modified example of the above embodiment will be described with reference to FIG. 5. In the present modified example, a guide groove 63 extending vertically is formed on the contact guide 57. The follower roller 61 slidably contacts with the contact guide 57 within the guide groove 63. Therefore, the movable saw blade guide 47 follows movements of the movable jaw 11 in the width direction (movements toward both of the one side and the other side), and thereby moves along with the movable jaw 11.

According to the present modified example, after stopping the workpiece W in the feed direction, the workpiece W is clamped by the fixed jaw 9 and the movable jaw 11 near the cutting position CP by moving the movable jaw 11 toward the one side in the width direction by the cylinder 13. At this time, the movable saw blade guide 47 is moved to a position associated with the movable jaw 11 along with the movements of the movable jaw 11. Namely, the distance between the fixed saw blade guide 45 and the movable saw blade guide 47 is adjusted automatically according to the width of the workpiece W. The advantages brought by the above embodiment can be brought similarly by the present modified example.

The present invention is not limited to the above embodiment, and can be practicable in various embodiments.

The invention claimed is:

1. A horizontal band saw machine that cuts a workpiece stopped on a feed direction while feeding an endless band saw blade circularly, the machine comprising:
   a base;
   a vise mechanism that is provided on a downstream side of a cutting position on the base, and includes a pair of jaws that faces each other along a width direction perpendicular to the feed direction to clamp the workpiece, a first one of the pair of jaws being provided on one side with respect to the cutting position along the width direction, and a second one of the pair of jaws being provided movably on another side along the width direction;
   a cutting head that is provided on the base vertically-movably, and extends in the width direction;
   a pair of saw blade wheels that are provided rotatably on the cutting head, and distanced from each other along the width direction;
   the band saw blade that is looped over the pair of saw blade wheels;
   a saw blade guide mechanism having a pair of saw blade guides that are suspended from the cutting head between the pair of saw blade wheels, saw blade guide inserts being provided at respective lower ends of the pair of saw blade guides, a first one of the pair of saw blade guides being provided on the one side, a second one of the pair of saw blade guides being provided on the other side movably in the width direction, and the band saw blade being twisted between the pair of saw blade guides to orient saw teeth thereof downward;
   a contact guide that is attached to the second one of the pair of jaws, and extends vertically;
   a coupling bracket having a base end connected to the second one of the pair of saw blade guides, and that is extended in the width direction to locate a distal end thereof below the second one of the pair of saw blade wheels; and
   a follower member that is provided at the distal end of the coupling bracket, and slidably contacts with the contact guide, the follower member being positioned outside of an outer periphery of the band saw blade and vertically beneath the band saw blade with respect to a direction extending upwardly from the base towards the cutting head, wherein
   the second one of the pair of saw blade guides is moved toward the one side in the width direction until the follower member contacts with the contact guide by feeding the band saw blade circularly in a state where the band saw blade is clamped by the saw blade guide insert of the second one of the pair of saw blade guides, wherein
   the coupling bracket extends in the width direction from the second one of the pair of saw blade guides to the contact guide when the follower engages the contact guide.

2. The horizontal band saw machine according to claim 1, wherein
   the contact guide and the coupling bracket are configured to move the second one of the pair of saw blade guides while following the second one of the pair of jaws when the second of the pair of jaws is moved further toward the other side in a state where the follower member contacts with the contact guide.

3. The horizontal band saw machine according to claim 1, further comprising:
   a coupling bar having a base end connected to an outer side of the second one of the pair of jaws, and is extended in the width direction to locate a distal end thereof below the second one of the pair of saw blade wheels, and
   the contact guide is provided at the distal end of the coupling bar.

4. A horizontal band saw machine that cuts a workpiece stopped on a feed direction while feeding an endless band saw blade circularly, the machine comprising:
   a base;
   a vise mechanism that is provided on a downstream side of a cutting position on the base, and includes a pair of jaws that faces each other along a width direction perpendicular to the feed direction to clamp the workpiece, a first one of the pair of jaws being provided on one side with respect to the cutting position along the width direction, and a second one of the pair of jaws being provided movably on another side along the width direction;
   a cutting head that is provided on the base vertically-movably, and extends in the width direction;
   a pair of saw blade wheels that are provided rotatably on the cutting head, and distanced from each other along the width direction;

the band saw blade that is looped over the pair of saw blade wheels;

a saw blade guide mechanism having a pair of saw blade guides that are suspended from the cutting head between the pair of saw blade wheels, saw blade guide inserts being provided at respective lower ends of the pair of saw blade guides, a first one of the pair of saw blade guides being provided on the one side, a second one of the saw blade guides being provided on the other side movably in the width direction, and the band saw blade being twisted between the pair of saw blade guides to orient saw teeth thereof downward;

a contact guide that is attached to the second one of the pair of jaws, and extends vertically, a guide groove extending vertically being formed thereon;

a coupling bracket having a base end connected to the second one of the pair of saw blade guides, and that is extended in the width direction to locate a distal end thereof below the second one of the pair of saw blade wheels; and a follower member that is provided at the distal end of the coupling bracket, and slidably contacts with the contact guide within the guide groove, the follower member being positioned outside of an outer periphery of the band saw blade and vertically beneath the band saw blade with respect to a direction extending upwardly from the base towards the cutting head, wherein the contact guide and the coupling bracket are configured to move the second one of the pair of saw blade guides in the width direction while following the second one of the pair of jaws when the second one of the pair of jaws is moved in the width direction, wherein the coupling bracket extends in the width direction from the second one of the pair of saw blade guides to the contact guide when the follower engages the contact guide.

5. The horizontal band saw machine according to claim 4, further comprising:

a coupling bar having a base end connected to an outer side of the second one of the pair of jaws, and is extended in the width direction to locate a distal end thereof below the second one of the pair of saw blade wheels, and the contact guide is provided at the distal end of the coupling bar.

\* \* \* \* \*